(12) United States Patent
Jump et al.

(10) Patent No.: US 11,900,410 B1
(45) Date of Patent: Feb. 13, 2024

(54) DIGITAL PROMOTION PROCESSING SYSTEM FOR DISPLAYING A SINGLE COMBINED DIGITAL PROMOTION AND RELATED METHODS

(71) Applicant: Inmar Clearing, Inc., Winston-Salem, NC (US)

(72) Inventors: Andrew B Jump, Lewisville, NC (US); Ali Mirian, Brooklyn, NY (US); Rob Weisberg, Lexington, MA (US)

(73) Assignee: INMAR CLEARING, INC., Winston-Salem, NC (US)

( * ) Notice: Subject to any disclaimer, the term of this patent is extended or adjusted under 35 U.S.C. 154(b) by 0 days.

(21) Appl. No.: 18/112,015

(22) Filed: Feb. 21, 2023

(51) Int. Cl.
*G06Q 30/00* (2023.01)
*G06Q 30/0238* (2023.01)
*G06Q 30/0207* (2023.01)

(52) U.S. Cl.
CPC ..... *G06Q 30/0238* (2013.01); *G06Q 30/0224* (2013.01)

(58) Field of Classification Search
None
See application file for complete search history.

(56) References Cited

U.S. PATENT DOCUMENTS

| | | | |
|---|---|---|---|
| 7,980,466 | B2 | 7/2011 | Lee et al. |
| 8,700,493 | B2 | 4/2014 | Cao |
| 9,124,954 | B2 | 9/2015 | Laksono et al. |
| 9,496,002 | B1 | 11/2016 | Yanagita |
| 10,250,538 | B2 | 4/2019 | Prabhu |
| 10,789,610 | B2 | 9/2020 | Smith |
| 11,120,465 | B1 | 9/2021 | Fei et al. |
| 11,551,252 | B1 | 1/2023 | Medina |

(Continued)

FOREIGN PATENT DOCUMENTS

CN     102625941 A  *  8/2012  ........... G06Q 20/387

OTHER PUBLICATIONS

Coupons in the News; "These Digital Coupons Clip Themselves—So Why Is that a Problem?"; 5 pages; website: couponsinthenews.com/2019/05/30/these-digital-coupons-clip-themselves-so-why-is-that-a-problem/; May 30, 2019.

(Continued)

*Primary Examiner* — Alvin L Brown
(74) *Attorney, Agent, or Firm* — ALLEN, DYER, DOPPELT, + GILCHRIST, P.A.

(57) ABSTRACT

A digital promotion processing system may include a shopper device associated with a given shopper, and a promotion processing server. The server may obtain product purchase data associated with the given shopper, and generate digital promotions based upon the product purchase data, each of the plurality of digital promotions being redeemable for a corresponding product for purchase. The server may also cooperate with the shopper device to display at least two of the digital promotions as a single combined digital promotion for corresponding complementary products for purchase and having associated therewith a single input for clipping the single combined digital promotion to a digital wallet. The server may also cooperate with the shopper device to display at least one other of the digital promotions and with an associated input for clipping of the corresponding digital promotion to the digital wallet associated with the given shopper.

24 Claims, 10 Drawing Sheets

(56) References Cited

U.S. PATENT DOCUMENTS

| | | | |
|---|---|---|---|
| 11,676,167 B2 * | 6/2023 | Zarakas | G06Q 30/0222 705/14.23 |
| 2008/0249866 A1 | 10/2008 | Angell et al. | |
| 2011/0191164 A1 | 8/2011 | Reichert | |
| 2014/0058823 A1 * | 2/2014 | Ross | G06Q 30/00 705/14.38 |
| 2019/0392487 A1 | 12/2019 | Duke | |

OTHER PUBLICATIONS

Goforth, Steven, U.S. Appl. No. 15/608,217, filed May 30, 2017.
Murphy, Joseph, U.S. Appl. No. 15/883,536, filed Jan. 30, 2018.

* cited by examiner

DIGITAL PROMOTION PROCESSING SYSTEM FOR DISPLAYING A SINGLE COMBINED DIGITAL PROMOTION AND RELATED METHODS

TECHNICAL FIELD

The present invention relates to the field of promotion processing, and, more particularly, to processing a single combined digital promotion.

BACKGROUND

Sales of a particular product or service may be based upon how well that product or service is marketed to a consumer. One form of marketing or promotion is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

Another form of marketing or promotion may be a rebate. A rebate, like a coupon, is a form of discount applicable toward the purchase of a given product. However, unlike a coupon, a rebate is paid retrospectively.

Bundling a product may include offering several products or services for sale as one combined product or service package. Oftentimes, the combined product or service, or bundle, has a purchase price less than a sum of the individual products or services that make up the bundle.

SUMMARY

A digital promotion processing system may include a shopper device associated with a given shopper, and a promotion processing server. The promotion processing server may be configured to obtain product purchase data associated with the given shopper, and generate a plurality of digital promotions based upon the product purchase data. Each of the plurality of digital promotions may be redeemable for a corresponding product for purchase. The promotion processing server may be configured to cooperate with the shopper device to display, on a display of the shopper device, at least two of the plurality of digital promotions as a single combined digital promotion for corresponding complementary products for purchase and having associated therewith a single input displayed on the display for clipping the single combined digital promotion to a digital wallet associated with the given shopper. The promotion processing server may also be configured to cooperate with the shopper device to display, on the display of the shopper device, at least one other of the plurality of digital promotions and with an associated input displayed on the display for clipping of the corresponding digital promotion to the digital wallet associated with the given shopper.

Each of the plurality of digital promotions may have an associated redeemable value. The single combined digital promotion may have a redeemable value equal to a sum of the redeemable values for the corresponding complementary products, for example.

The promotion processing server may be configured to apply a machine learning algorithm to determine the at least two digital promotions based upon the product purchase data, and update the machine learning algorithm based upon the given shopper clipping the single combined digital promotion to the digital wallet. The promotion processing server may be configured to update the machine learning algorithm based upon the given shopper clipping the at least one other digital promotion, for example.

The promotion processing server may be configured to, upon shopper input to the single input displayed on the display, store the single combined digital promotion to the digital wallet, for example. The product purchase data may include historical product purchase data associated with the given shopper.

The product purchase data may include historical product purchase data associated with the given shopper and other shoppers. The complementary products may include products purchased during a same purchase transaction based upon the product purchase data, for example.

The complementary products may include at least one of products of a same category and products of a same brand. The promotion processing server may be configured to cooperate with a point-of-sale (POS) device to apply a stored digital promotion in the digital wallet to a purchase of the corresponding product for purchase, for example.

A method aspect is directed to a method of processing a promotion. The method may include using a promotion processing server to obtain product purchase data associated with a given shopper, and generate a plurality of digital promotions based upon the product purchase data, each of the plurality of digital promotions being redeemable for a corresponding product for purchase. The method may also include using the promotion processing server to cooperate with a shopper device associated with the given shopper to display, on a display of the shopper device, at least two of the plurality of digital promotions as a single combined digital promotion for corresponding complementary products for purchase and having associated therewith a single input displayed on the display for clipping the single combined digital promotion to a digital wallet associated with the given shopper. The method may further include using the promotion processing server to cooperate with the shopper device to display, on the display of the shopper device, at least one other of the plurality of digital promotions and with an associated input displayed on the display for clipping of the corresponding digital promotion to the digital wallet associated with the given shopper.

A computer readable medium aspect is directed to a non-transitory computer readable medium for processing a promotion. The non-transitory computer readable medium includes computer executable instructions that when executed by a processor cause the processor to perform operations. The operations may include obtaining product purchase data associated with a given shopper, and generating a plurality of digital promotions based upon the product purchase data. Each of the plurality of digital promotions may be redeemable for a corresponding product for purchase. The operations may also include cooperating with a shopper device associated with the given shopper to display, on a display of the shopper device, at least two of the plurality of digital promotions as a single combined digital promotion for corresponding complementary products for purchase and having associated therewith a single input displayed on the display for clipping the single combined digital promotion to a digital wallet associated with the given shopper. The operations may further include cooperating with the shopper device to display, on the display of the shopper device, at least one other of the plurality of digital promotions and with an associated input displayed on the display for clipping of the corresponding digital promotion to the digital wallet associated with the given shopper.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation is used to indicate similar elements in alternative embodiments.

Figure 1:
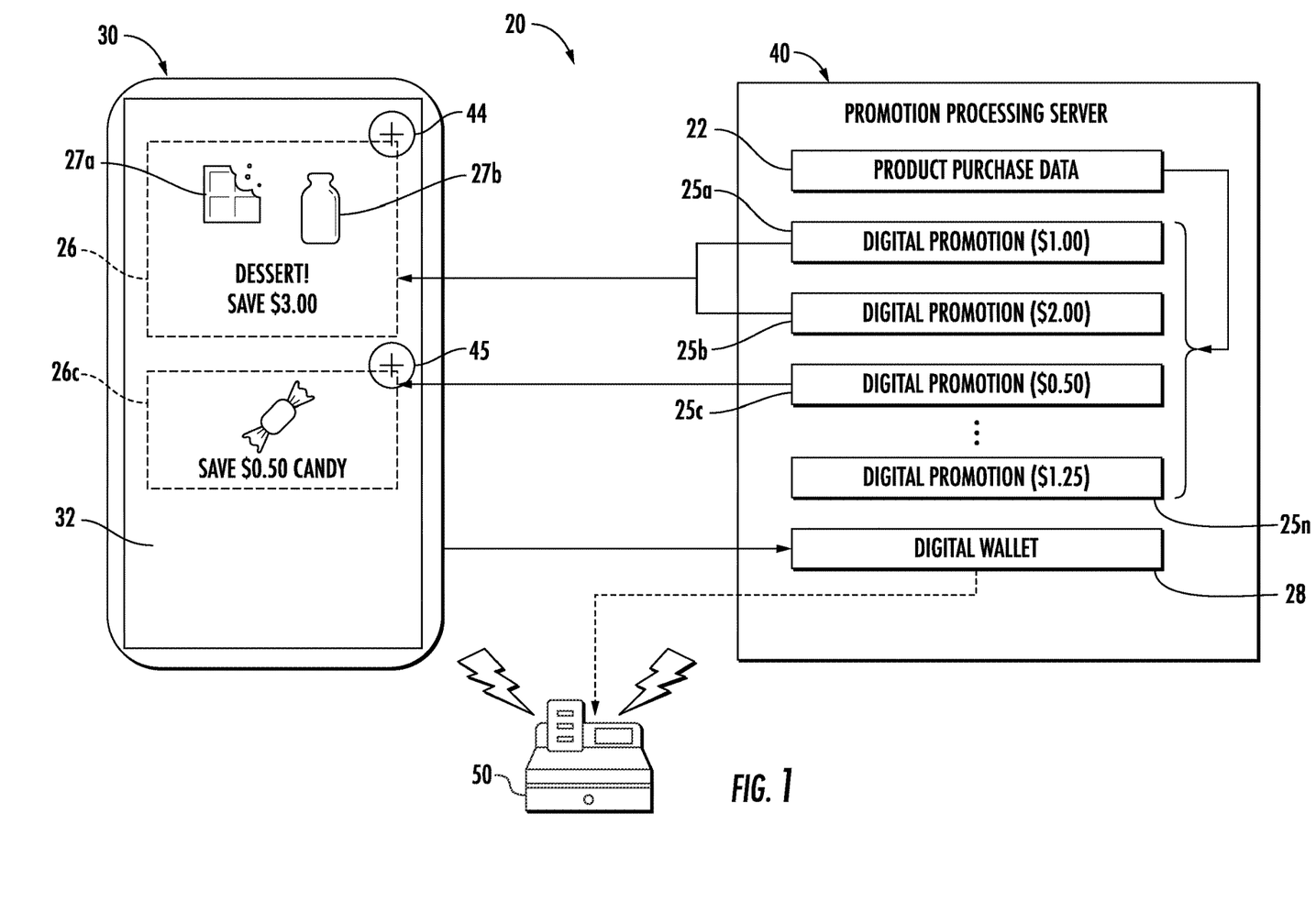
FIG. 1 is a schematic diagram of a digital promotion processing system in accordance with an embodiment.
Figure 2:
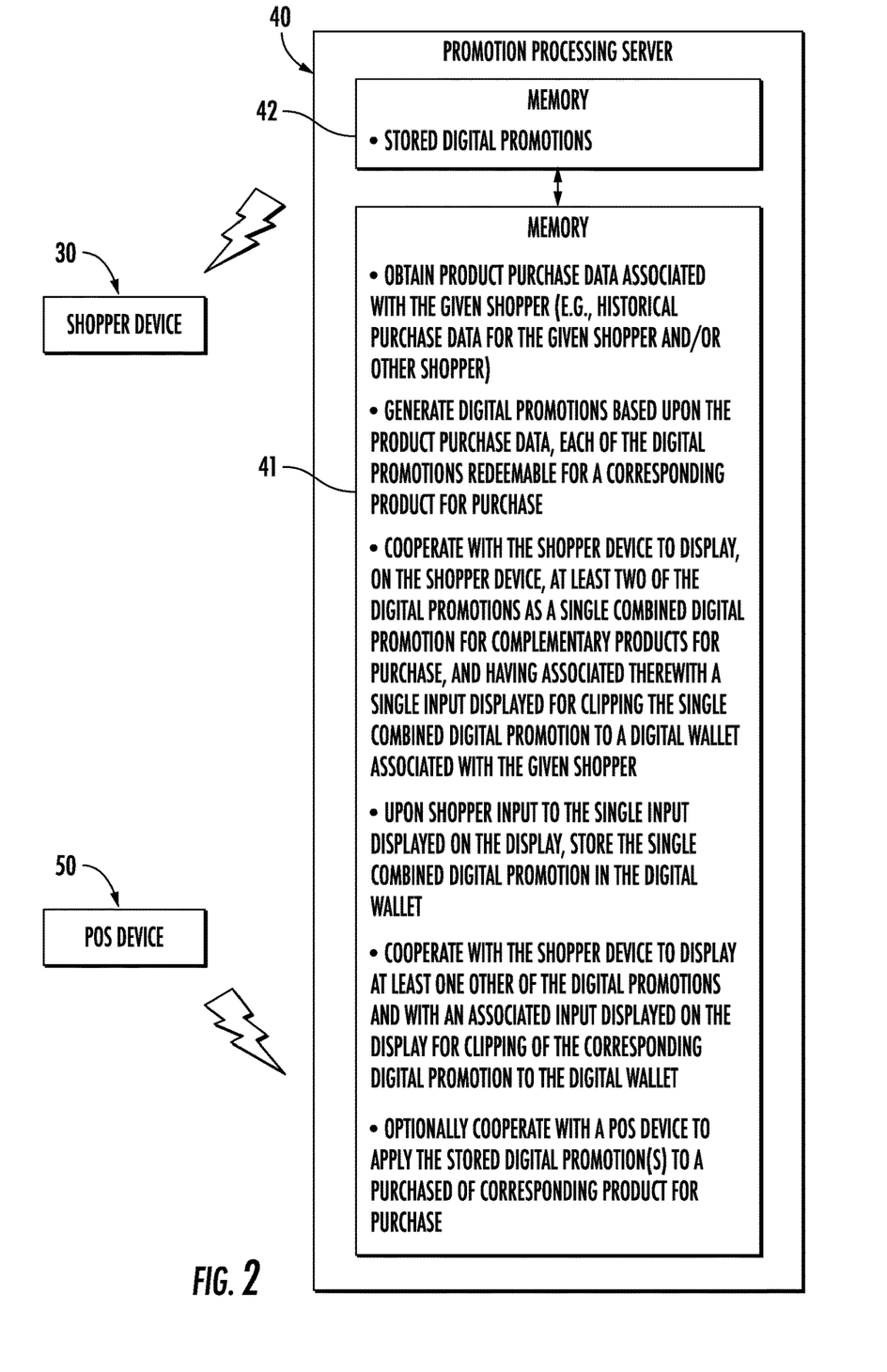
FIG. 2 is a schematic block diagram of a portion of the digital promotion processing system of FIG. 1.

Referring initially to FIGS. 1 and 2, a digital promotion processing system 20 includes a shopper device 30 associated with a given shopper. The shopper device 30 is illustratively in the form of a mobile wireless communications device, and more particularly, a smartphone. Of course, the shopper device 30 may be in the form of another type of device, for example, a desktop computer, a laptop computer, a tablet computer, or a wearable computer.

The digital promotion processing system 20 also includes a promotion processing server 40. The promotion processing server 40 includes a processor 41 and an associated memory 42. While operations of the promotion processing server 40 are described herein, it should be understood that the processor 41 and memory 42 cooperate to perform the operations.

Figure 3:
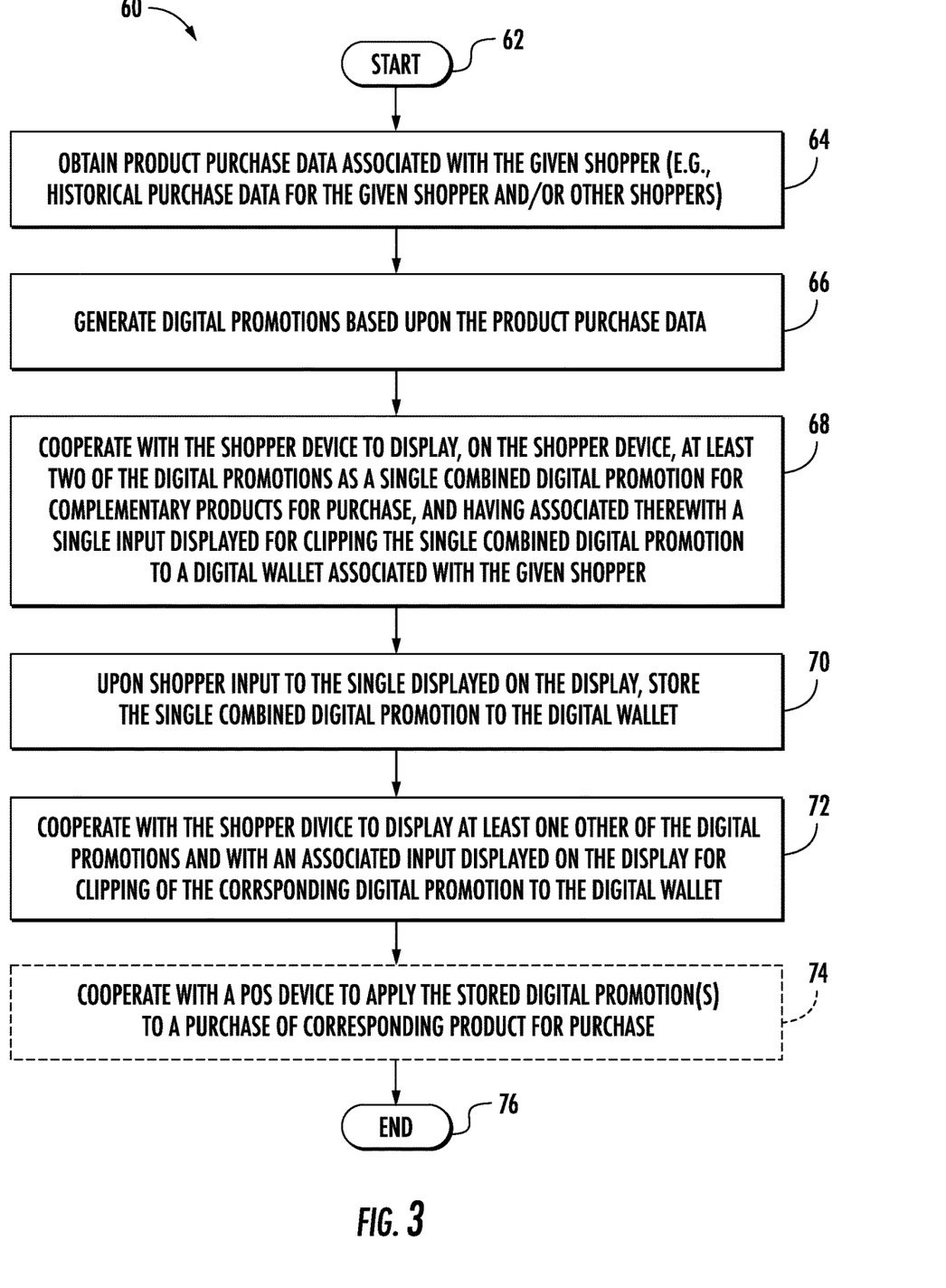
FIG. 3 is a flow chart illustrating operation of the promotion processing server of FIG. 2.

Referring now additionally to the flowchart 60 in FIG. 3, beginning at Block 62, operations of the promotion processing server 40 will now be described. The promotion processing server, at Block 64, obtains product purchase data 22 associated with the given shopper. The product purchase data 22 may include historical product purchase data, for example, including dates, times, store locations, quantities, product identifiers, descriptions, prices paid, payment methods, and whether a coupon was redeemed. The product purchase data 22 may include historical product purchase data associated with other shoppers.

Product purchase data 22 may also include, alternatively or additionally, data input from the given shopper or other shoppers, for example, data that defines a shopper profile including dietary preference data, brand preference data, shopping list data, etc. The product purchase data 22 may be obtained, or inferred or determined by the promotion processing server 40, for example, based upon the given shopper's and/or other shopper's interactions with retailers (e.g. obtained via a point-of-sale (POS) device). The product purchase data 22 may include, for example, based upon communications with the retailers, attributes of product being purchased, for example, nutritional value of the products being purchased and/or historically purchased, and/or a category or subcategory of the products being purchased and/or historically purchased. Of course, the product purchase data 22 may include other and/or additional data for the given shopper and/or other shoppers.

The promotion processing server 40 may obtain the product purchase data 22 by way of cooperation with a retailer or wholesaler computer system, for example, and/or a point-of-sale (POS) device 50 (e.g., virtual and/or physical). More particularly, the promotion processing server 40 may retrieve the product purchase data 22 from the retailer or wholesaler system periodically, or in real time, in which case, the promotion processing server may obtain basket data from POS devices during a checkout process. The promotion processing server 40 may cooperate to obtain loyalty program data for the given shopper and/or other shoppers at a given retailer, for example, based upon a unique shopper identifier, such as, for example, an email address or phone number. In some embodiments, the promotion processing server 40 may communicate with the POS devices and operate a loyalty program for one or more retailers. For example, the promotion processing server 40 may store promotions, digital wallets, product purchase histories for many shoppers and across retailers, and cooperate with the POS devices to process, for example, verify and apply, the promotions.

The promotion processing server 40 generates digital promotions 25a-25n based upon the product purchase data 22 (Block 66). More particularly, the digital promotions 25a-25n may be selected from stored digital promotions, for example, in the memory 42, based upon the given shopper's historical purchase data. In other words, the promotion processing server 40 may generate the digital promotions 25a-25n by accessing and selecting ones of stored digital promotions in the memory 42, which may conceptually be considered a pool or library of stored digital promotions. In some embodiments, the promotion processing server 40 may generate one or more digital promotions as new (i.e., not from digital promotions 25a-25n) stored in the memory 42). The digital promotions 25a-25n may be alternatively or additionally be generated based upon other shopper's historical purchase data. The generation of the digital promotions 25a-25n based upon the product purchase data 22 may be considered to be generation of targeted promotions (e.g., targeted to the given shopper), as will be appreciated by those skilled in the art. The digital promotions 25a-25n may be generated based upon advertising and marketing campaign rules, for example, shopper personal data, demographics, geographic location, budgets, etc. The generated digital promotions 25a-25n may be less than a total number of digital promotions stored in the memory 42. The digital promotions 25a-25n may be redeemable toward products previously purchased, new products related to previously purchased products, a different brand of products previously purchased, etc.

Each of the digital promotions 25a-25n has an associated redeemable value, for example, that is redeemable toward the purchase of a corresponding product for purchase. In other words, the digital promotions 25a-25n may be in the form of digital coupons. Alternatively, the digital promotions 25a-25n may be in the form of digital rebates.

Each of the digital promotions 25a-25n may be associated with one or more products for purchase. Each of the products for purchase may have a product identifier associated therewith, for example, a universal product code (UPC), price look up (PLU), stock keeping unit (SKU), and/or other type of identifier. Thus, each digital promotion 25a-25n may be associated with one or more product identifiers. The digital promotions 25a-25n may be stored in the memory 42 based upon the respective product identifiers. More particularly, the digital promotions 25a-25n may be indexed, for example, in a database in the memory 42, by product identifier. Thus, the promotion processing server 40 may generate and/or display the digital promotions 25a-25n based upon selected product identifiers for the given shopper.

At Block 68, the promotion processing server 40 cooperates with the shopper device 30 to display, on a display 32 of the shopper device, at least two 25a, 25b of the digital promotions 25a-25n (FIG. 1). The two digital promotions 25a, 25b are displayed as a single combined digital promotion 26 for corresponding complementary products for purchase 27a, 27b (e.g., chocolate and milk). Complementary products, for example, may include products purchased during a same purchase transaction based upon the product historical purchase data 22. The complementary products 27a, 27b may include products of a same category and/or of a same brand. For example, complementary products may include peanut butter and jelly, laundry detergent and dryer sheets, yogurt and granola, and/or items typically used together. The complementary products 27a, 27b may be determined based upon product identifiers, for example, UPCs. Selection of the complementary products 27a, 27b may be determined based upon the product purchase data 22, for example, historical purchase data of the given shopper and/or other shoppers.

Further details of how the promotion processing server 40 displays the two digital promotions 25a, 25b as a single combined digital promotion 26 will now be described. Each digital promotion 25a-25n may be represented by corresponding images. The images may include images of each product for purchase corresponding to a digital promotion and may be stored in a database in the memory 42. Other information, for example, text, gradients, backgrounds, borders, etc. may be included with each digital promotion 25a-25n. Each digital image may be stored based upon lossy compression algorithm, such as, for example, based upon a JPEG format. The promotion processing server 40 may convert or translate digital images, for example, uploaded in a given format to another format.

The promotion processing server 40 may, to combine the two digital promotions 25a, 25b to a single combined digital promotion 26, apply image combination techniques, for example, image fusion techniques. As will be appreciated by those skilled in the art, pixels representative of the product for purchase may be extracted (e.g., using border and pixel recognition techniques) from each digital image and placed in a same new single digital image, for example, adjacent. The single combined digital image defining the single combined digital promotion 26 may be given a file name representative of the combined product for purchase, category thereof, event, occasion, or season, for example. Further details of the naming of the file or image associated with the single combined digital promotion 26 will be described below. Other and/or additional visual characteristics of the single combined digital promotion 26 may be added, as will be described in further detail below.

The single combined digital promotion 26 has a redeemable value equal to the sum of the redeemable values for the individual digital promotions 25a, 25b corresponding to the complementary products 27a, 27b. In other words, the redeemable value of the single combined digital promotion 26 is the same as if both the first and second digital promotions 25a, 25b were separate digital promotions. Accordingly, the single combined digital promotion 26 may not be considered a bundle offer, whereby the redeemable value of the combined bundle digital promotion is greater than the redeemable values of the promotions that make up the bundle.

The combined redeemable value or the redeemable value of the single combined digital promotion 26 may be determined based upon metadata associated with either or both of images of the complementary products 27a, 27b or the first and second digital promotions 25a, 25b. In other words, either or both of the first and second digital promotions 25a, 25b, and the images of the complementary products 27a, 27b may each have metadata associated therewith. The metadata may include the corresponding redeemable values. The promotion processing server 40 may extract the metadata associated with the first and second digital promotions 25a, 25b (e.g., including any metadata associated with the corresponding images), and generate combined metadata, or new metadata representative of the combined redeemable value, and associated with the single combined digital promotion 26 or the combined image thereof. In some embodiments, the metadata associated with the first and second digital promotions 25a, 25b may be provided to an application programming interface (API) as inputs thereto. The API call may output the updated or new metadata, as will be appreciated by those skilled in the art.

The single combined digital promotion 26 has associated therewith a single input 44 displayed on the display 32. The promotion processing server 40 cooperates with the shopper device 30 to display on the display 32, for example, an icon that upon input provided thereto, for clipping the single combined digital promotion 26 to a digital wallet 28 associated with the given shopper. When, for example, the display 32 is in the form of a touch screen display, a touch adjacent or to the single input 44 may clip the single combined digital promotion 26 to the digital wallet 28. Input may be provided by the given shopper to the single input 44 using other techniques, as will be appreciated by those skilled in the art. Upon shopper input to the single input 44 displayed on the display 32, the promotion processing server 40 stores the single combined digital promotion 26 (Block 70).

At Block 72, the promotion processing server 40 cooperates with the shopper device 30 to display, on the display 32 of the shopper device, another 25c of the digital promotions 25c-25n. The other digital promotion 25c is associated with an input 45 displayed on the display 32 for clipping of the corresponding digital promotion 25c to the digital wallet 28 associated with the given shopper. The input 45 is similar to the single input 44 described above, however, applicable to the other, uncombined, digital promotion 25c. The promotion processing server 40 may display more than one other digital promotion 25c-25n for clipping.

The promotion processing server 40 may optionally, at Block 74, cooperate with a point-of-sale (POS) device 50 to apply a stored digital promotion for example, stored in the digital wallet 28, to a purchase of the corresponding product or products for purchase. More particularly, after digital promotions 25a-25n are saved to the digital wallet 28, the given shopper may wish to redeem one or more of the digital promotions. To redeem, for example, the promotion processing server 40 may cooperate with a POS device 50 to validate and apply the digital promotions 25a-25n. The promotion processing server 40 may store redemption information related to the digital promotions 25a-25n including the single combined digital promotion 26, for the given shopper and/or other shoppers. In some embodiments, the promotion processing server 40 may cooperate with a payment processing server to process payment, for example, a card payment. Operations end at Block 76.

Figure 4:
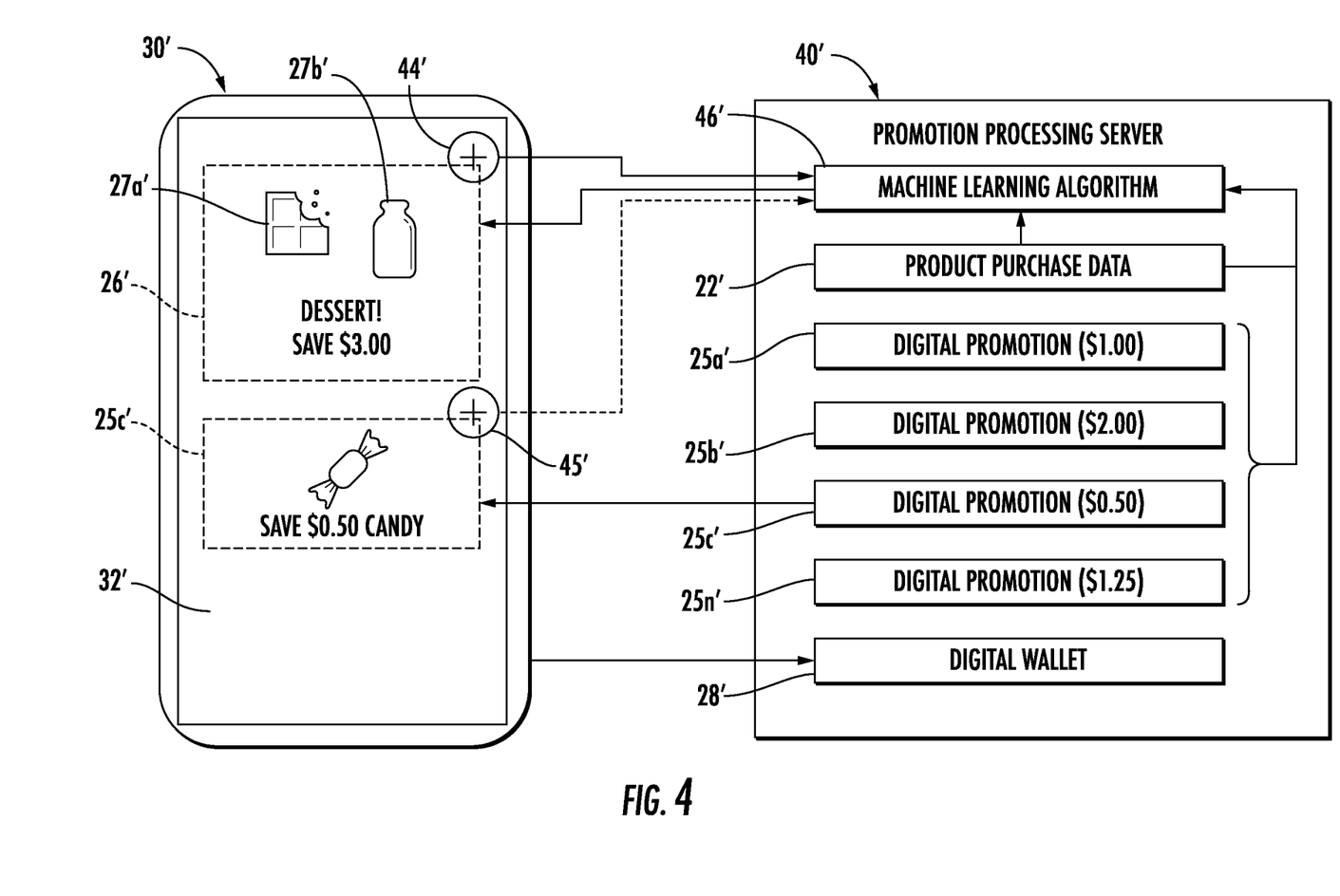
FIG. 4 is a schematic diagram of a portion of a digital promotion processing system in accordance with another embodiment.

Referring now to FIG. 4, in another embodiment, the promotion processing server 40' may apply a machine learning algorithm 46' to determine the digital promotions 25a', 25b' or complementary products 27a', 27b, for the single combined digital promotion 26' to display on the display 32' based upon the product purchase data 22', for example, historical purchase data. More particularly, the promotion processing server 40' accepts, as input to the machine learning algorithm 46', the product purchase data 22' and outputs the digital promotions 25a', 25b' for the single combined digital promotion 26', or in some embodiments, the single combined digital promotion itself. In some embodiments, the machine learning algorithm 46' may output one or more product identifiers, for example, UPCs, for the digital promotions 25a' 25b'. Other and/or additional inputs may be provided to the machine learning algorithm 46', for example, whether the given shopper has clipped to the digital wallet 28' and/or redeemed the single combined digital promotion 26', whether other shoppers have clipped and/or redeemed the single combined digital promotion, whether the shopper has provided positive or negative feedback regarding the digital promotions 25a'-25n' and/or the single combined digital promotion 26', and whether other shoppers have provided positive or negative feedback regarding the digital promotions and/or the single combined digital promotion. Any of the above inputs may be used to train or update the machine learning algorithm 46' such that any subsequent operation of the machine learning algorithm may result in a different outcome, thus effectuating a change or transformation in the algorithm 26' and thus the promotion processing server 40' in and of itself. The single input 44' and the other input 45' are similar to those described above for saving the single combined digital promotion 26' and other digital promotion 25c' to the digital wallet 28'.

A machine learning algorithm, similar to the algorithm described above, may be operated by the promotion processing server 40' to generate the digital promotions 25a'-25n'. As will be appreciated by those skilled in the art, the machine learning algorithm 46' or algorithms may be particularly advantageous for generating promotions for the given shopper for products for purchase including for the complementary products 27a', 27b' that the given shopper is likely to purchase (e.g., because of historical purchase patterns, desire based upon weather, special events, etc.)

Figure 5:
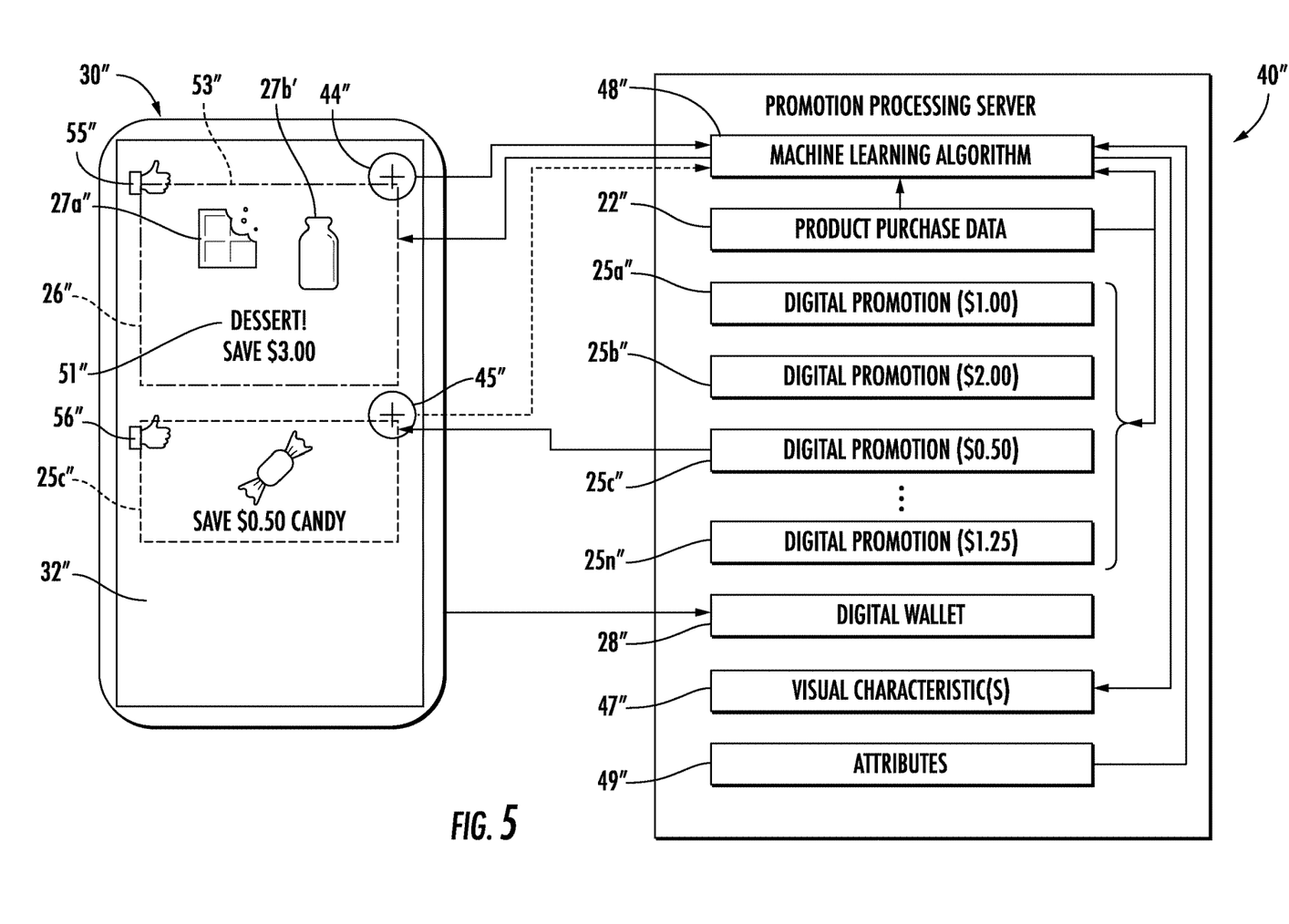
FIG. 5 is a schematic diagram of a portion of a digital promotion processing system in accordance with another embodiment.
Figure 6:
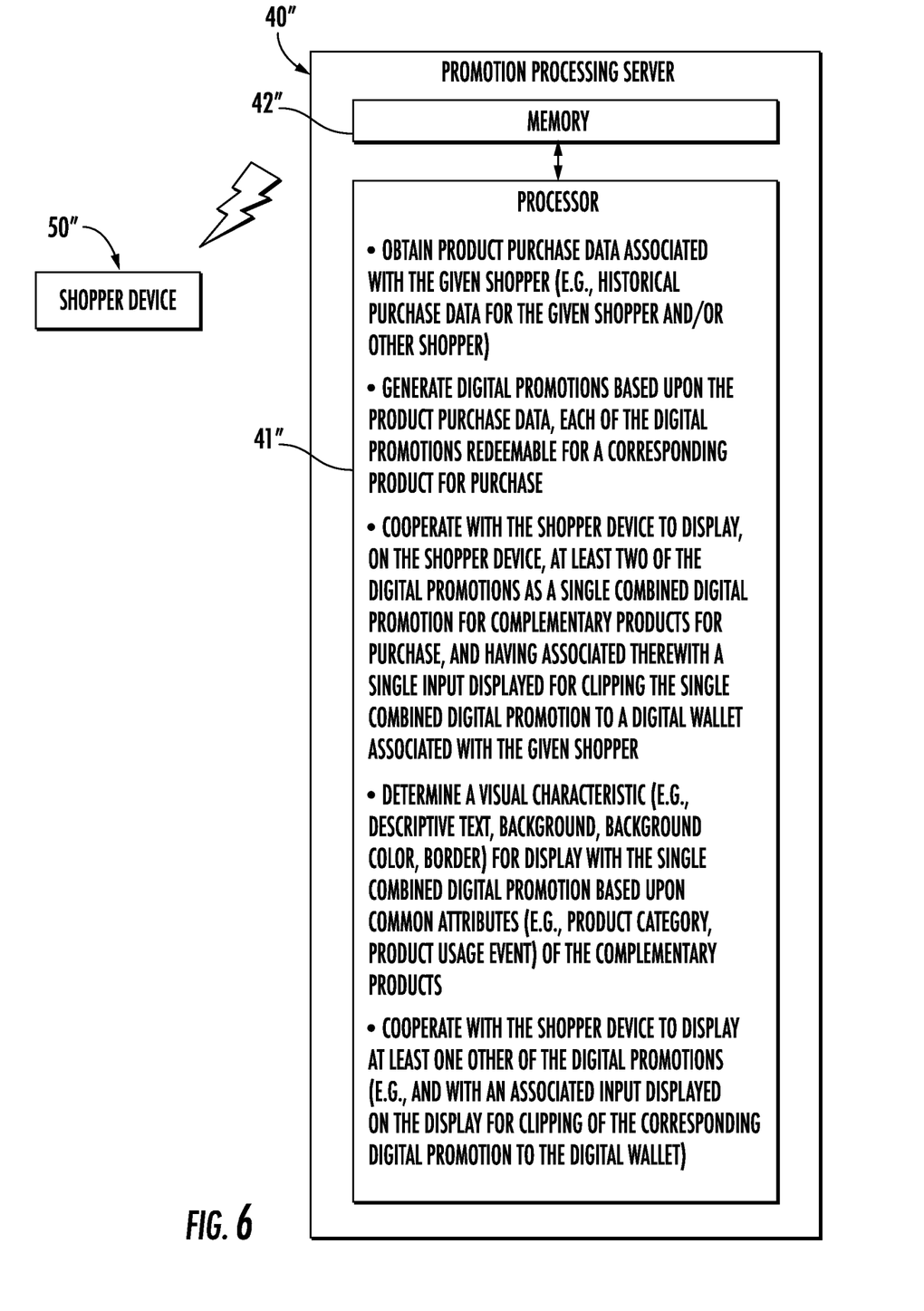
FIG. 6 is a schematic block diagram of the digital promotion processing system of FIG. 5.
Figure 7:
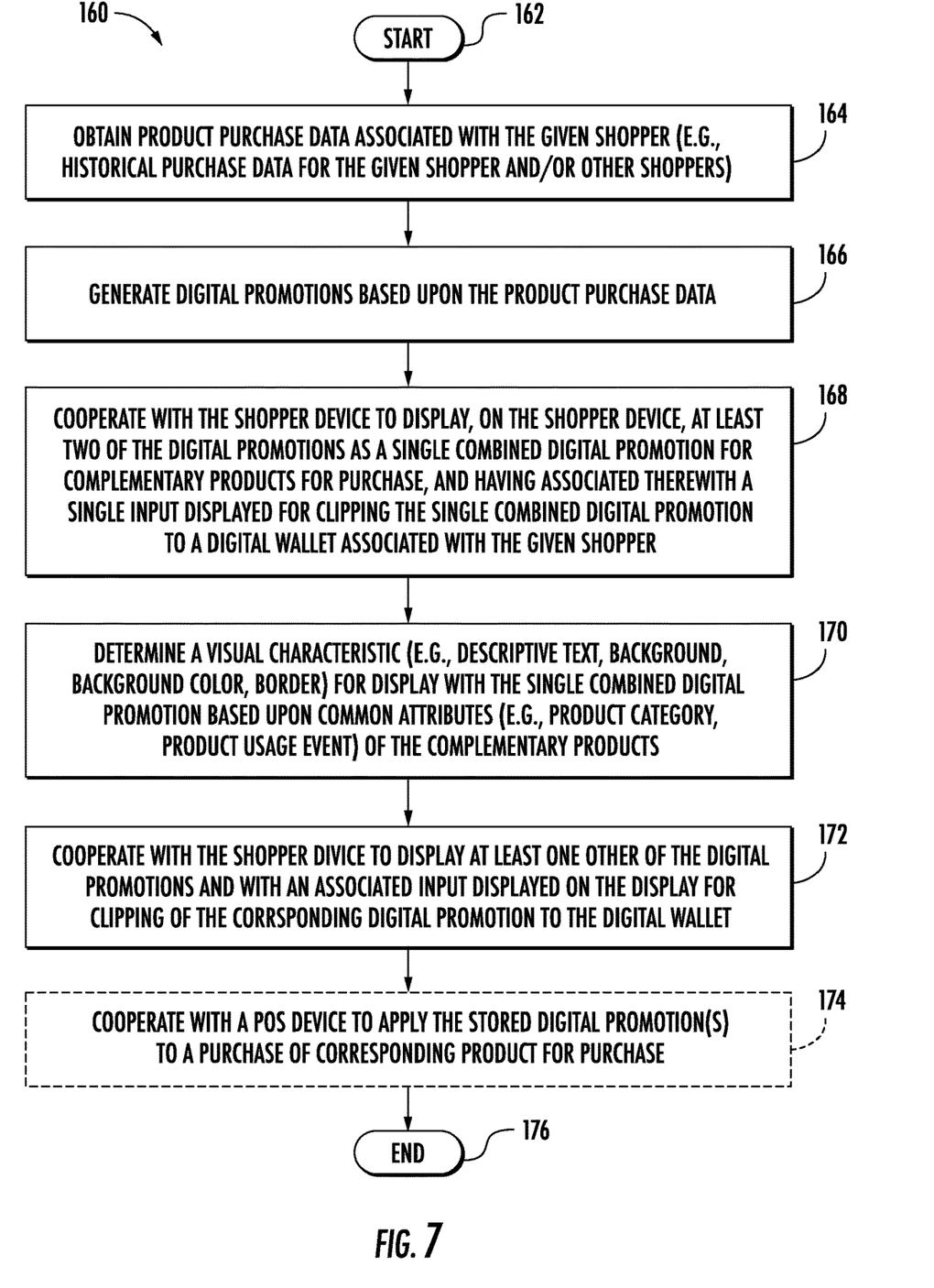
FIG. 7 is flow chart illustrating operation of the promotion processing server of FIG. 6.

Referring now additionally to FIGS. 5-6, and the flowchart 160 in FIG. 7, beginning at Block 162, in another embodiment, the promotion processing server 40" may determine one or more visual characteristics for the single combined digital promotion 26". Blocks 164-168 are similar to Blocks 64-68 described in the embodiments above. At Block 170, the promotion processing server 40" determines visual characteristics 47" for display with the single combined digital promotion 26" based upon common attributes 49" of the complementary products 27a", 27b". Each product for purchase has a product attribute 49" associated therewith. Product attributes 49" may include season of use (e.g., spring, summer, fall, winter, holiday), event (e.g., cleaning, Big Game, dinner party, campout, holiday gathering, and BBQ), occasion (e.g., school lunch, back to school, late night snack, baking, breakfast in bed, family dinners), category, such as, for example, consistent with a grocery store layout (e.g., beverages, health and beauty, paper products, meal solutions, frozen treats, appetizers), and historical names (e.g., S'mores bundle, school snacks, spring cleaning deals, birthday bundle, healthy teeth). Of course, the product attributes 49" may include other and/or additional attributes, as will be appreciated by those skilled in the art.

The promotion processing server 40" may determine the common product attribute or attributes by correlating the product attributes for each product. A common product attribute may be determined based upon matched product attributes. The promotion processing server 40" may determine a number of matching product attributes for the complementary products 27a", 27b". Based upon the matching product attributes themselves and/or the amount of matching product attributes, the promotion processing server 40" may determine the visual characteristics.

The promotion processing server 40" may also determine the visual characteristics 47" based upon a time of year, for example, a current time of year. For example, the promotion processing server 40" may determine the visual characteristics based upon a month. The promotion processing server 40" may determine the visual characteristics 47" alternatively or additionally based upon current and/or forecast weather conditions. For example, the promotion processing server 40" may communicate with a remote computer to retrieve, for example, via an API call, the weather for a geographic location associated with the given shopper. The geographic location of the given shopper may be determined based upon a network address associated with the shopper device 30", geographic position data obtained from the shopper device, for example, from a global positioning system receiver, location of purchased products based upon the product purchase data 22", and/or shopper data associated with the given shopper, for example, shopper profile data associated with a shopper identifier of the given shopper.

The visual characteristics 47" may include descriptive text 51" descriptive of the single combined digital promotion 26". For example, the complementary products 27a", 27b" may be dip and chips. The promotion processing server 40" based upon the product attributes 49" determines how the complementary products are consumed, and determines that the complementary products correspond to a party treat and the date (e.g., of display on the display 32") is the week of the Big Game. Thus promotion processing server 40" may generate and display text, "For the Big Gameday" along with the images of the chips and dip defining the single combined digital promotion 26". As it relates to weather, for example, the promotion processing server 40" in an exemplary embodiment may generate complementary products for cold weather, such as, for example, snow, along with descriptive text along the lines of "Stay Warm Deal" or "Storm Preparation Deal".

In some embodiments, the promotion processing server 40" may compare the descriptive text 51" to a list of terms that may be undesirable for either or both of the complementary products 27a", 27b". The undesirable terms may be provided by the respective manufacturers, for example, and stored in a database in the memory 42" (e.g., indexed by product identifier). The promotion processing server 40" may, when undesirable terms or determined, determine new descriptive text 51". The promotion processing server 40" may analyze the descriptive text 51" during the determination or generation of the descriptive text. The promotion processing server 40" may additionally analyze pairings of terms or the descriptive text 51" as a whole (i.e., not individual terms) for undesirable phrases or terms that when considered together may be undesirable.

Figure 8:
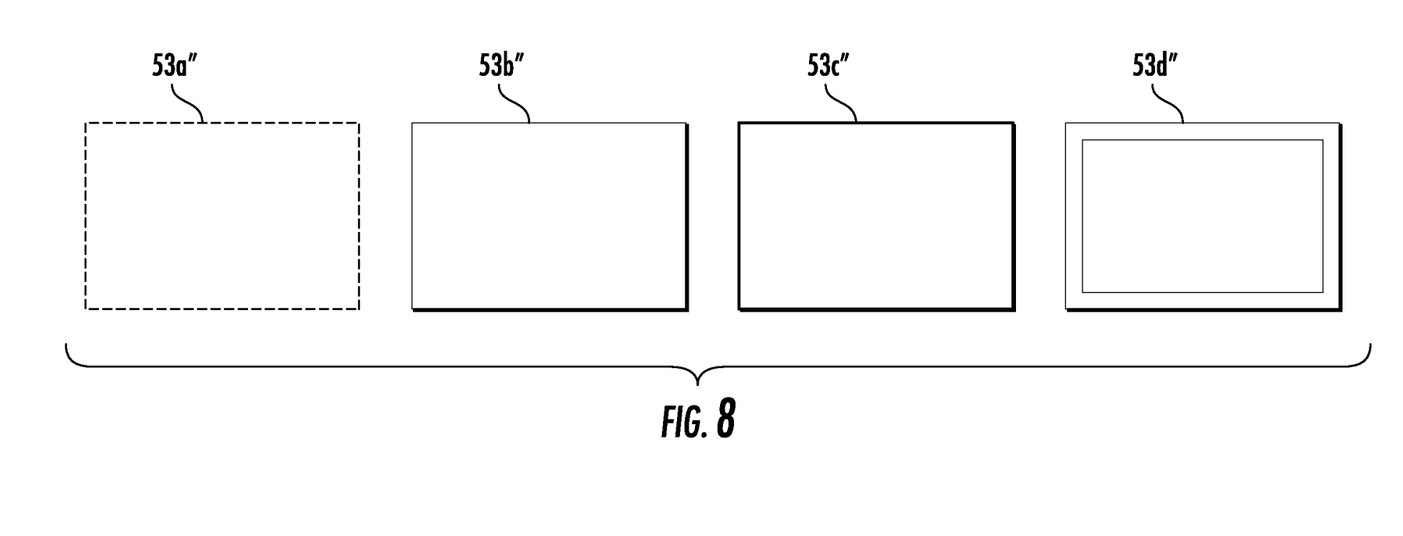
FIG. 8 is a diagram illustrating different border visual characteristics generated by the digital promotion processing system of FIG. 5.

The visual characteristic 47" may include one or both of background 52" (e.g., color) of the single combined digital promotion 26", text color of any descriptive text 51", and a border 53" of the signal combined digital promotion. Referring to FIG. 8, examples of a single combined digital promotion 26" within a single frame may include a dotted line border 53a", a thin border 53b", a thick border 53c" or a frame border 53d, for example. A border 53" may be a different type of border.

Figure 9:
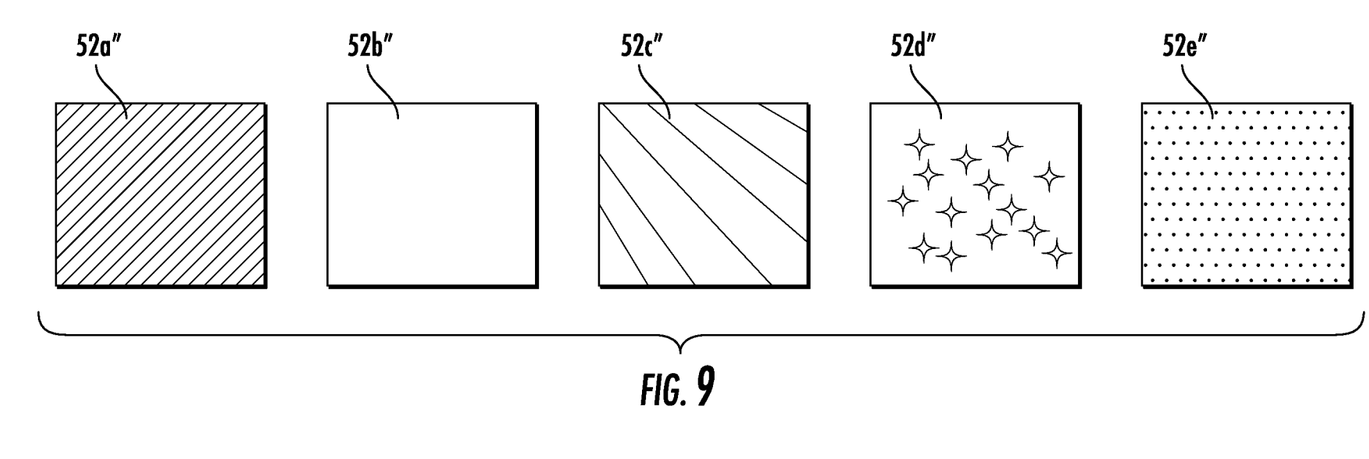
FIG. 9 is a diagram illustrating different background visual characteristics generated by the digital promotion processing system of FIG. 5.

Referring to FIG. 9, examples of a background 52" of a single combined digital promotion 26" may include a solid background 52a", a gradient background 52b", a lined background 52c", a star background 52d", and a dotted background 52e". Other backgrounds may be determined and displayed with or as part of the single combined digital promotion 26".

Figure 10:
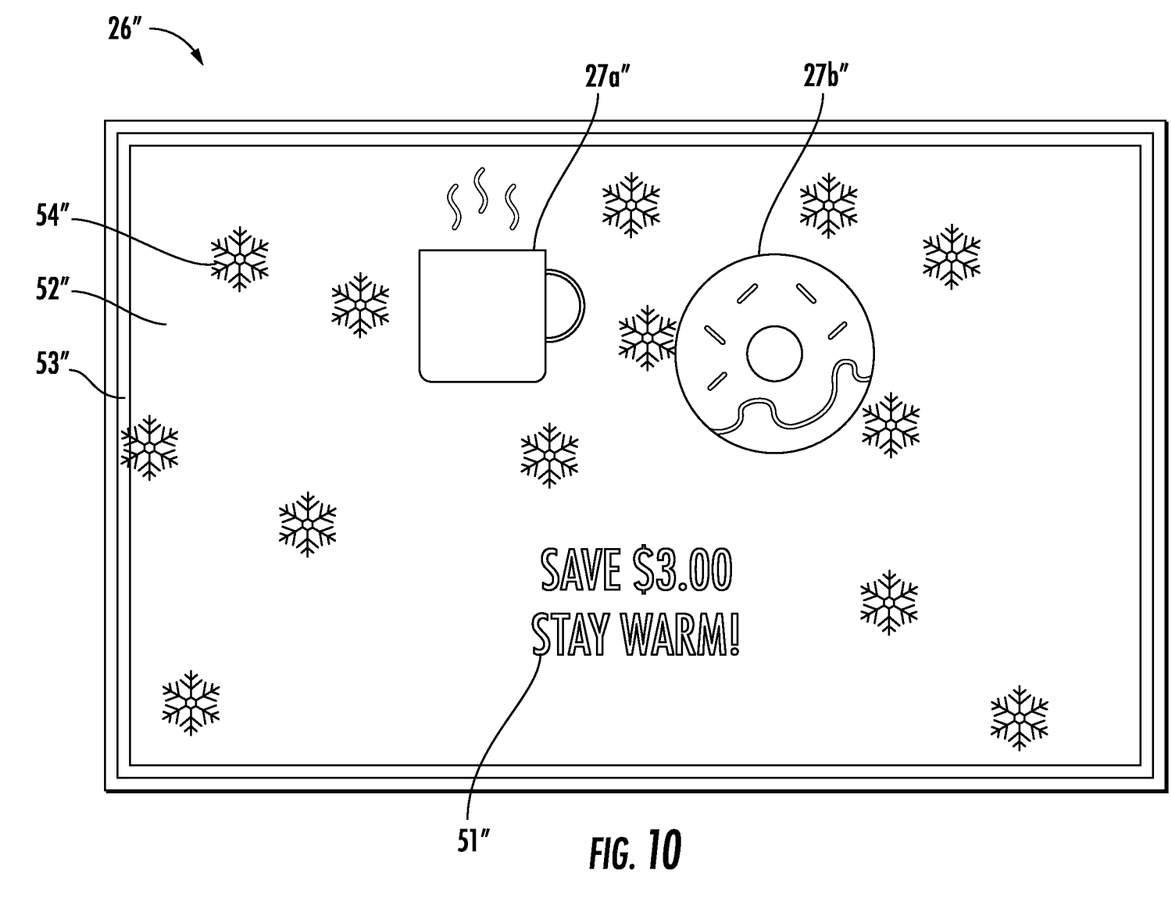
FIG. 10 is an exemplary single combined digital promotion generated by the digital promotion processing system of FIG. 5.

Referring briefly to FIG. 10, with respect to weather, for example, the promotion processing server 40" may determine and display, as an exemplary single combined digital promotion 26", in a cold weather or snow based single combined digital promotion (e.g., for exemplary complementary products 27a", 27b", such as, coffee and a donut), as described above, a light blue background 52", white descriptive text 51", a solid white border 53", and snow flake icons 54" within the background. Other exemplary single combined digital promotions 26" having visual characteristics 47" determined by the promotion processing server 40" and displayed based upon the product attributes 49" may include a "Camp Out Night" promotion having a dark background with orange text, and a dotted border, and corresponding to a chocolate bar, graham crackers, and marshmallows as the complementary products.

In another exemplary single combined digital promotion 26", laundry detergent and dryer sheets may be the complementary products with a white background and a thin border. In yet another exemplary single combined digital promotion 26", yogurt and granola may be the complementary products with a dotted background and a thin border.

As it relates to the visual characteristics 47", the promotion processing server 40" may operate a machine learning algorithm 48". The machine learning algorithm 48" may accept as input thereto, the complementary products 27a", 27b", and outputs the visual characteristics 47". More particularly, the machine learning algorithm 48" may determine which visual characteristics 47" for a given set of complementary products 27a", 27b" are most likely to result in a shopper acting upon the single combined digital promotion 26" (i.e., clip to a digital wallet 28", purchase the complementary products, and/or redeem the single combined digital promotion).

The single combined digital promotion 26" illustratively includes an input 55" displayed on the display 32" for providing feedback relating to the single combined digital promotion 26". The input 55" is illustratively in the form of a "thumbs-up" icon, whereby the given shopper can provide positive feedback whether they like (or dislike) the single combined digital promotion 26". The promotion processing server 40" may train the machine learning algorithm 48" based upon the corresponding feedback and/or whether the single combined digital promotion 26" has been redeemed. For example, for given visual characteristics 47", the machine learning algorithm 48" may determine whether they are more or less likely to result in positive shopper action, such as, purchasing the complementary products 27a", 27b", and when the given shopper has provided positive feedback via the input 55". In contrast, if, for a given combination of visual characteristics 47" there is a reduced number of positive shopper action (e.g., shopper inaction, no purchase, no clipping, clipping, but no purchase), the machine learning algorithm 48" may be updated and trained so that upon a next iteration of the machine learning algorithm the visual characteristics may be different for a same set of complementary products 27a", 27b". Other and/or additional inputs may be provided to the machine learning algorithm 48", for example, as described above with respect to other machine learning functions of the promotion processing server 40". An input 56" may be displayed for the other digital promotion(s) 25c".

At Block 172, the promotion processing server 40" cooperates with the shopper device 30" to display, on the display 32", one or more other digital promotions 25c"-25n", similar to the embodiment above described with respect to Block 72. At Block 174, the promotion processing server 40" optionally cooperates with a POS device to apply stored digital promotions 25a"-25n" to a purchase, similarly to operations described above with respect to Block 74. Operations end at Block 176.

A method aspect is directed to a method of processing a promotion. The method includes using a promotion processing server 40 to obtain product purchase data 22 associated with a given shopper, and generate a plurality of digital promotions based upon the product purchase data, each of the plurality of digital promotions 25a-25n being redeemable for a corresponding product for purchase. The method also includes using the promotion processing server 40 to cooperate with a shopper device 30 associated with the given shopper to display, on a display 32 of the shopper device, at least two of the plurality of digital promotions 25a, 25b as a single combined digital promotion 26 for corresponding complementary products 27a, 27b for purchase and having associated therewith a single input 44 displayed on the display for clipping the single combined digital promotion to a digital wallet 28 associated with the given shopper. The method further includes using the promotion processing server 40 to cooperate with the shopper device to display, on the display 32 of the shopper device 30, at least one other of the plurality of digital promotions 25c and with an associated input 45 displayed on the display for clipping of the corresponding digital promotion to the digital wallet 28 associated with the given shopper.

A computer readable medium aspect is directed to a non-transitory computer readable medium for processing a promotion. The non-transitory computer readable medium includes computer executable instructions that when executed by a processor 41 cause the processor to perform operations. The operations include obtaining product purchase data 22 associated with a given shopper, and generating a plurality of digital promotions 25a-25n based upon the product purchase data. Each of the plurality of digital promotions 25a-25n may be redeemable for a corresponding product for purchase. The operations also include cooperating with a shopper device 30 associated with the given shopper to display, on a display 32 of the shopper device, at least two of the plurality of digital promotions 25a, 25b as a single combined digital promotion 26 for corresponding complementary products for purchase and having associated therewith a single input 44 displayed on the display 32 for clipping the single combined digital promotion 26 to a digital wallet 28 associated with the given shopper. The operations may further include cooperating with the shopper device 30 to display, on the display 32 of the shopper device, at least one other 25c of the plurality of digital promotions 25a-25n and with an associated input 45 displayed on the display for clipping of the corresponding digital promotion to the digital wallet 28 associated with the given shopper.

Another method aspect is directed to a method of processing a digital promotion may include using a promotion processing server 40" to obtain product purchase data 22" associated with the given shopper, and generate a plurality of digital promotions 25a"-25n" based upon the product purchase data. Each of the plurality of digital promotions 25a"-25n" may be redeemable for a corresponding product for purchase, and each of the products for purchase may be associated with a plurality of product attributes 49". The method may also include using the promotion processing server 40" to cooperate with a shopper device 30" associated with a given shopper to display, on a display 32" of the shopper device, at least two of the plurality of digital promotions 25a", 25b" as a single combined digital promotion 26" for corresponding complementary products 27a", 27b" for purchase. The method may further include using the promotion processing server 40" to determine at least one visual characteristic 47" for display with the single combined digital promotion 26" based upon a common product attribute 49" for the complementary products 27a", 27b", and cooperate with the shopper device 30" to display, on the display 32" of the shopper device, at least one other 25c" of the plurality of digital promotions 25a"-25n".

Another computer readable medium aspect is directed to a non-transitory computer readable medium for processing a digital promotion, the non-transitory computer readable medium including computer executable instructions that when executed by a processor 41" cause the processor to perform operations. The operations may include obtaining product purchase data 22" associated with the given shopper, and generating a plurality of digital promotions 25a"-25n" based upon the product purchase data. Each of the plurality of digital promotions 25a"-25n" may be redeemable for a corresponding product for purchase, and each of the products for purchase may be associated with a plurality of product attributes 49". The operations may also include cooperating with a shopper device 30" associated with a given shopper to display, on a display 32" of the shopper device, at least two of the plurality of digital promotions 25a", 25b" as a single combined digital promotion 26" for corresponding complementary products 27a", 27b" for purchase, and determining at least one visual characteristic 47" for display with the single combined digital promotion 49" for the complementary products. The operations may further include cooperating with the shopper device 30" to display, on the display 32" of the shopper device, at least one other of the plurality of digital promotions 25a"-25n".

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A digital promotion processing system comprising:
a shopper device associated with a given shopper; and
a promotion processing server configured to
obtain product purchase data associated with the given shopper,
generate a plurality of digital promotions based upon the product purchase data, each of the plurality of digital promotions being redeemable for a corresponding product for purchase and being associated with corresponding digital images,
cooperate with the shopper device to display, on a display of the shopper device, at least two of the plurality of digital promotions as a single combined digital promotion for corresponding complementary products for purchase by extracting pixels from the digital images corresponding to the at least two of the plurality of digital promotions and generating a new combined digital image associated with the single combined digital promotion for display on the display, the single combined digital promotion having associated therewith a single input displayed on the display for clipping the single combined digital promotion to a digital wallet associated with the given shopper,
operate a machine learning algorithm to determine visual characteristics associated with the single combined digital promotion, the machine learning algorithm accepting as input thereto the complementary products and output therefrom the visual characteristics, and the machine learning algorithm being trained based upon input to the single input, and
cooperate with the shopper device to display, on the display of the shopper device, at least one other of the plurality of digital promotions and with an associated input displayed on the display for clipping of the corresponding digital promotion to the digital wallet associated with the given shopper.

2. The digital promotion processing system of claim 1 wherein each of the plurality of digital promotions has an associated redeemable value, and wherein the single combined digital promotion has a redeemable value equal to a sum of the redeemable values for the corresponding complementary products.

3. The digital promotion processing system of claim 1 wherein the promotion processing server is configured to operate a further machine learning algorithm to determine the at least two digital promotions based upon the product purchase data, and update the machine learning algorithm based upon the given shopper clipping the single combined digital promotion to the digital wallet.

4. The digital promotion processing system of claim 3 wherein the promotion processing server is configured to update the machine learning algorithm based upon the given shopper clipping the at least one other digital promotion.

5. The digital promotion processing system of claim 1 wherein the promotion processing server is configured to, upon shopper input to the single input displayed on the display, store the single combined digital promotion to the digital wallet.

6. The digital promotion processing system of claim 1 wherein the product purchase data comprises historical product purchase data associated with the given shopper.

7. The digital promotion processing system of claim 1 wherein the product purchase data comprises historical product purchase data associated with the given shopper and other shoppers.

8. The digital promotion processing system of claim 1 wherein the complementary products comprise products purchased during a same purchase transaction based upon the product purchase data.

9. The digital promotion processing system of claim 1 wherein the complementary products comprise at least one of products of a same category and products of a same brand.

10. The digital promotion processing system of claim 1 wherein the promotion processing server is configured to cooperate with a point-of-sale (POS) device to apply a stored digital promotion in the digital wallet to a purchase of the corresponding product for purchase.

11. A promotion processing server comprising:
a processor and an associated memory configured to
obtain product purchase data associated with a given shopper,
generate a plurality of digital promotions based upon the product purchase data, each of the plurality of digital promotions being redeemable for a corresponding product for purchase and being associated with corresponding digital images,
cooperate with a shopper device associated with the given shopper to display, on a display of the shopper device, at least two of the plurality of digital promotions as a single combined digital promotion for corresponding complementary products for purchase by extracting pixels from the digital images corresponding to the at least two of the plurality of digital promotions and generating a new combined digital image associated with the single combined digital promotion for display on the display, the single combined digital promotion having associated therewith a single input displayed on the display for clipping the single combined digital promotion to a digital wallet associated with the given shopper,
operate a machine learning algorithm to determine visual characteristics associated with the single combined digital promotion, the machine learning algorithm accepting as input thereto the complementary products and output therefrom the visual characteristics, and the machine learning algorithm being trained based upon input to the single input, and
cooperate with the shopper device to display, on the display of the shopper device, at least one other of the plurality of digital promotions and with an associated input displayed on the display for clipping of the corresponding digital promotion to the digital wallet associated with the given shopper.

12. The promotion processing server of claim 11 wherein each of the plurality of digital promotions has an associated redeemable value, and wherein the single combined digital promotion has a redeemable value equal to a sum of the redeemable values for the corresponding complementary products.

13. The promotion processing server of claim 11 wherein the processor is configured to apply a further machine learning algorithm to determine the at least two digital promotions based upon the product purchase data, and update the machine learning algorithm based upon the given shopper clipping the single combined digital promotion to the digital wallet.

14. The promotion processing server of claim 13 wherein the processor is configured to update the machine learning algorithm based upon the given shopper clipping the at least one other digital promotion.

15. The promotion processing server of claim 11 wherein the processor is configured to, upon shopper input to the single input displayed on the display, store the single combined digital promotion to the digital wallet.

16. The promotion processing server of claim 11 wherein the product purchase data comprises historical product purchase data associated with at least one of the given shopper and other shoppers.

17. A method of processing a promotion comprising:
using a promotion processing server to
obtain product purchase data associated with a given shopper,
generate a plurality of digital promotions based upon the product purchase data, each of the plurality of digital promotions being redeemable for a corresponding product for purchase and being associated with corresponding digital images,
cooperate with a shopper device associated with the given shopper to display, on a display of the shopper device, at least two of the plurality of digital promotions as a single combined digital promotion for corresponding complementary products for purchase by extracting pixels from the digital images corresponding to the at least two of the plurality of digital promotions and generating a new combined digital image associated with the single combined digital promotion for display on the display, the single combined digital promotion having associated therewith a single input displayed on the display for clipping the single combined digital promotion to a digital wallet associated with the given shopper,
operate a machine learning algorithm to determine visual characteristics associated with the single combined digital promotion, the machine learning algorithm accepting as input thereto the complementary products and output therefrom the visual characteristics, and the machine learning algorithm being trained based upon input to the single input, and
cooperate with the shopper device to display, on the display of the shopper device, at least one other of the plurality of digital promotions and with an associated input displayed on the display for clipping of the corresponding digital promotion to the digital wallet associated with the given shopper.

18. The method of claim 17 wherein each of the plurality of digital promotions has an associated redeemable value, and wherein the single combined digital promotion has a redeemable value equal to a sum of the redeemable values for the corresponding complementary products.

19. The method of claim 17 wherein using the promotion processing server comprises using the promotion processing server to apply a further machine learning algorithm to determine the at least two digital promotions based upon the product purchase data, and update the machine learning algorithm based upon the given shopper clipping the single combined digital promotion to the digital wallet.

20. The method of claim 17 wherein using the promotion processing server comprises using the promotion processing server to, upon shopper input to the single input displayed on the display, store the single combined digital promotion to the digital wallet.

21. A non-transitory computer readable medium for processing a promotion, the non-transitory computer readable medium comprising computer executable instructions that when executed by a processor cause the processor to perform operations comprising:
    obtaining product purchase data associated with a given shopper;
    generating a plurality of digital promotions based upon the product purchase data, each of the plurality of digital promotions being redeemable for a corresponding product for purchase and being associated with corresponding digital images;
    cooperating with a shopper device associated with the given shopper to display, on a display of the shopper device, at least two of the plurality of digital promotions as a single combined digital promotion for corresponding complementary products for purchase by extracting pixels from the digital images corresponding to the at least two of the plurality of digital promotions and generating a new combined digital image associated with the single combined digital promotion for display on the display, the single combined digital promotion having associated therewith a single input displayed on the display for clipping the single combined digital promotion to a digital wallet associated with the given shopper;
    operating a machine learning algorithm to determine visual characteristics associated with the single combined digital promotion, the machine learning algorithm accepting as input thereto the complementary products and output therefrom the visual characteristics, and the machine learning algorithm being trained based upon input to the single input; and
    cooperating with the shopper device to display, on the display of the shopper device, at least one other of the plurality of digital promotions and with an associated input displayed on the display for clipping of the corresponding digital promotion to the digital wallet associated with the given shopper.

22. The non-transitory computer readable medium of claim 21 wherein each of the plurality of digital promotions has an associated redeemable value, and wherein the single combined digital promotion has a redeemable value equal to a sum of the redeemable values for the corresponding complementary products.

23. The non-transitory computer readable medium of claim 21 wherein the operations comprise applying a further machine learning algorithm to determine the at least two digital promotions based upon the product purchase data, and updating the machine learning algorithm based upon the given shopper clipping the single combined digital promotion to the digital wallet.

24. The non-transitory computer readable medium of claim 21 wherein the operations comprise, upon shopper input to the single input displayed on the display, storing the single combined digital promotion to the digital wallet.

* * * * *